United States Patent Office 3,494,701
Patented Feb. 10, 1970

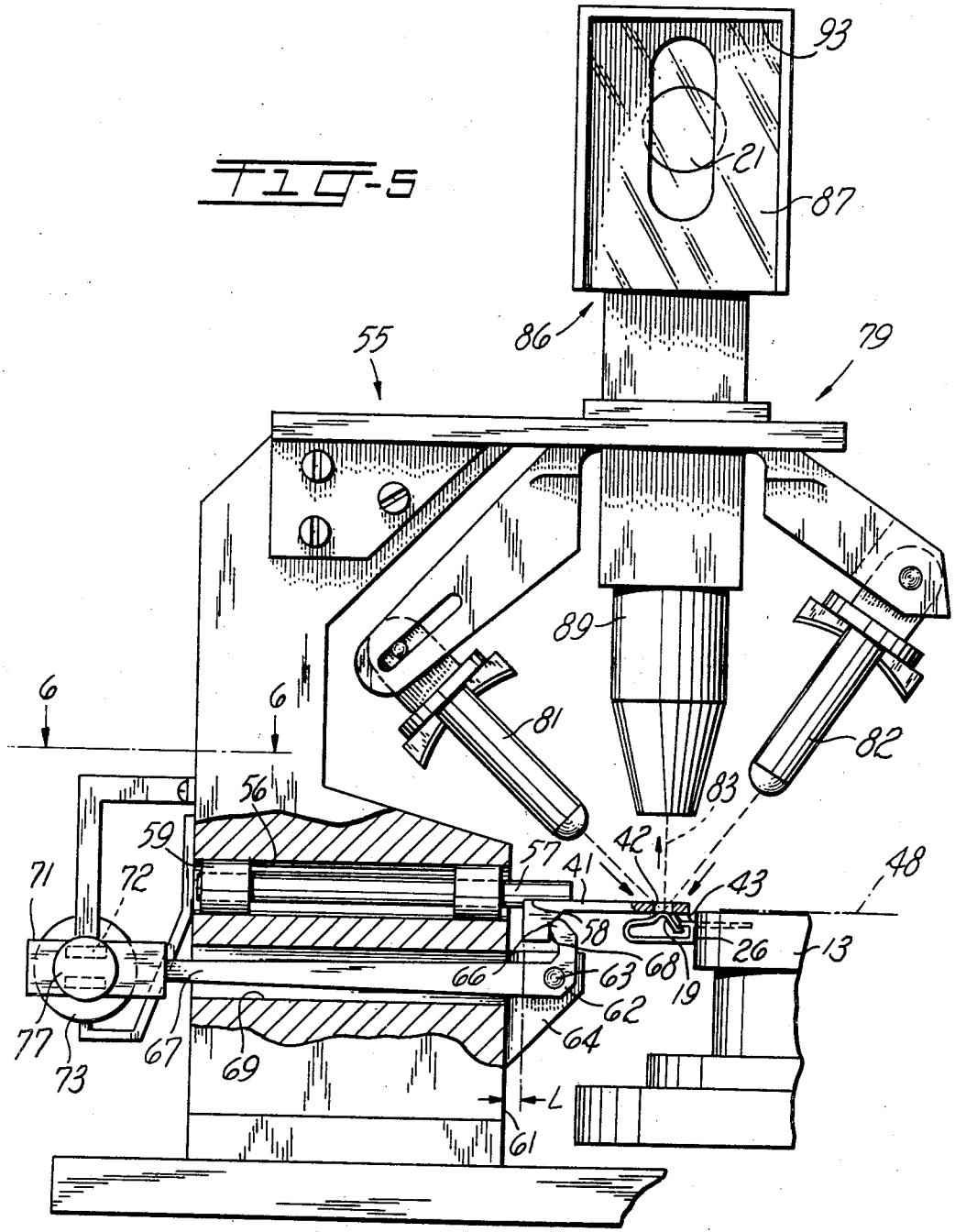

3,494,701
OPTICAL INSPECTION STATION
Carl Bernard Haehner, Jr., Flemington, and Willard Emanuel Rapp, North Brunswick, N.J., assignors to Western Electric Company, Incorporated, New York, N.Y., a corporation of New York
Filed Aug. 22, 1967, Ser. No. 662,470
Int. Cl. G01b 9/08
U.S. Cl. 356—166                               8 Claims

ABSTRACT OF THE DISCLOSURE

A protuberance on a contact spring is indexed into a slotted mask and displaces the latter by an amount indicative of the location of the protuberance on the spring. A shutter responsive to the amount of the displacement selectively excites a pair of photocells for indicating when the protuberance location is proper. The displacement of the mask further aligns the slot with the overlay if the latter is correctly positioned on the protuberance. An enlarged image of the slot in the displaced mask is projected onto a viewing screen for inspecting the overlay.

BACKGROUND OF THE INVENTION

Contact springs are frequently employed in conjunction with printed circuit boards and the like. Typically, the springs are mounted within suitable connector blocks into which the boards are inserted. As a result of the insertion, the protuberant portion of the spring is forced into intimate engagement with the board. In particular, the area of the protuberant portion which engages the inserted board is provided with a precious metal overlay, usually of gold, to improve the electrical contact between the spring and the board.

The proper location of the protuberance on the spring and the proper position of the gold overlay on the protuberance are both critical in obtaining the desired electrical contact at assembly. At present, the determination of whether each of these locations is within the required tolerances is ascertained by manual gaging techniques. Since a great number of such contact springs are produced annually, such manual operations are time consuming, fatiguing and ineffiicent even on a spot-check basis.

SUMMARY OF THE INVENTION

These disadvantages are alleviated by a contact spring inspection apparatus constructed in accordance with the invention. This apparatus is capable of automatically and simultaneously determining whether the location of the protuberance on the spring and the location of the gold overlay on the protuberance are proper. In a preferred embodiment, the contact springs to be tested are fixedly supported in a rotary turret and are successively indexed into a mask having a slot whose width is slightly smaller than the desired width of the gold contact on the protuberance. The mask is mounted for translational movement in a radial direction with respect to the turret. A pivoted lever normally biases the mask in a direction away from the turret center against a first reference surface with the slot out of alignment with the gold overlay on the protuberance. The indexing of the spring into the mask causes an essentially linear side of the spring protuberance to engage a depending camming surface on the mask. The continual movement of the spring against the camming surface displaces the mask in the direction toward the turret center until the slot is generally aligned with the gold overlay on the protuberance. The correct positioning and width of the overlay is indicated by the overlapping of the gold portion beyond both edges of the slot and may be inspected visually by projecting an enlarged image of the slotted region of the mask onto a suitable viewing screen.

The displacement of the mask toward the turret center pivots the biasing lever so that a shutter affixed to the other end of the lever moves arcuately into the path of illumination of a pair of spaced photodetectors. The displacement of the mask from the first reference surface, which is proportional to the distance of the protuberance from a second reference surface on the spring, will cause the shutter to block illumination from both of the photodetectors only when such displacement is within predetermined limits. Otherwise, either one or the other of the photodetectors will be illuminated. The photodetectors are arranged to automatically indicate a first condition (corresponding to a correct location of the protuberance) when both are blocked, and a second condition (corresponding to an incorrect location of the protuberance) in all other cases.

The concurrently filed, commonly assigned application, Ser. No. 662,324 of W. E. Rapp, discloses substantially the same contact spring inspection apparatus described herein. The instant joint invention is an improvement over this sole invention of W. E. Rapp; said improvement residing in the addition of optical projecting and photoelectric indicating means.

BRIEF DESCRIPTION OF THE DRAWING

The nature of the present invention and its advantages will become more apparent from the following detailed description when taken in connection with the appended drawing in which:

FIG. 5 is an elevational view of a more detailed version of the apparatus of FIG. 1;

DETAILED DESCRIPTION

Figure 1:
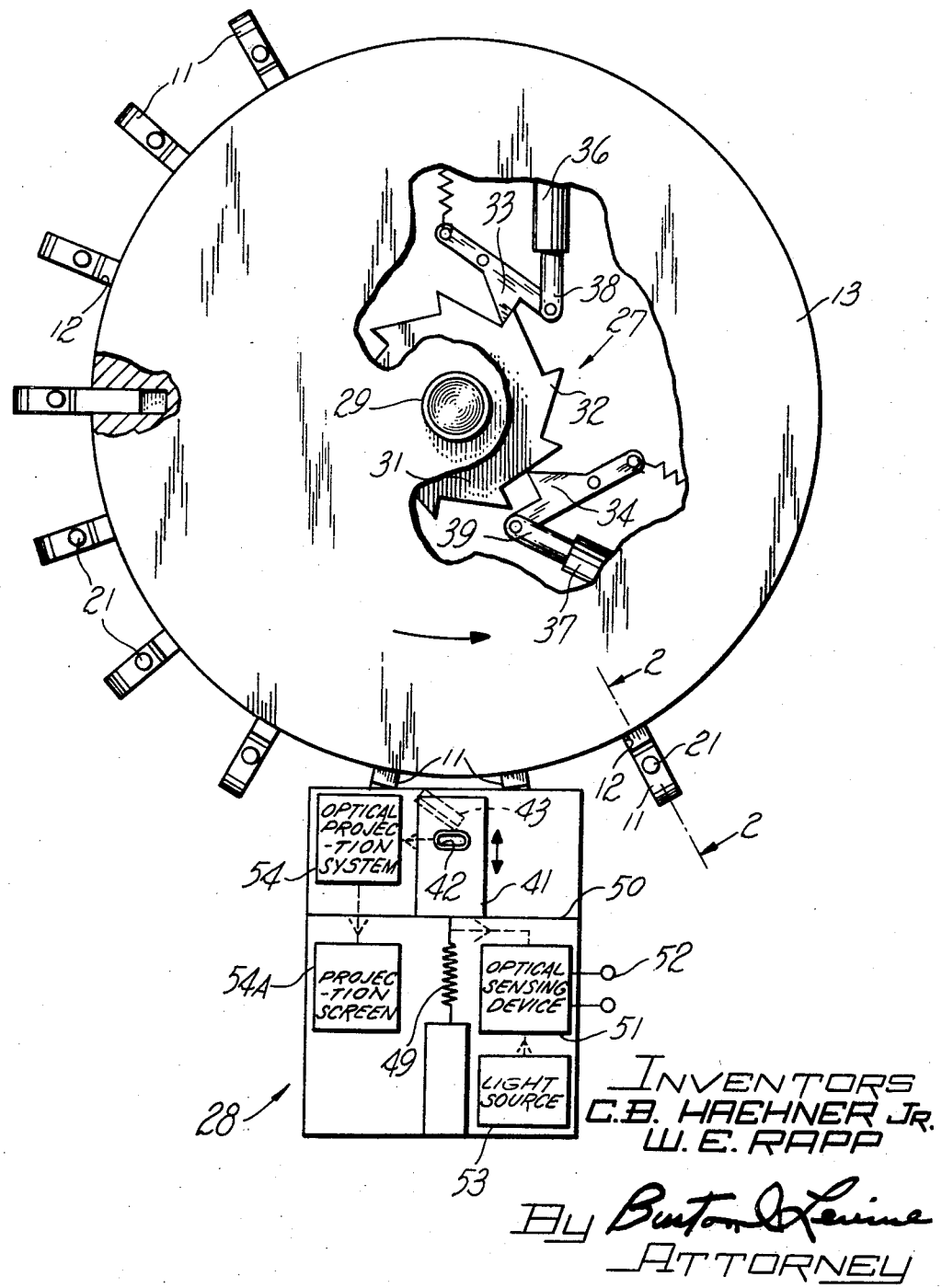
FIG. 1 is a plan view, partially broken away and partially in diagrammatic form, of a spring inspection apparatus constructed in accordance with the invention.

Referring now in more detail to the drawing and more particularly to FIG. 1, a plan view of an illustrative inspection station for automatically testing a plurality of contact springs 11 is depicted. The springs to be tested are received in a plurality of slot-like nests 12—12 disposed at equally spaced angular intervals around the periphery of a turntable 13, which is rotatable in a horizontal plane. Each received spring is supported against movement relative to the turntable in both horizontal and vertical planes (such as by spring-loaded means not illustrated).

Figure 2:
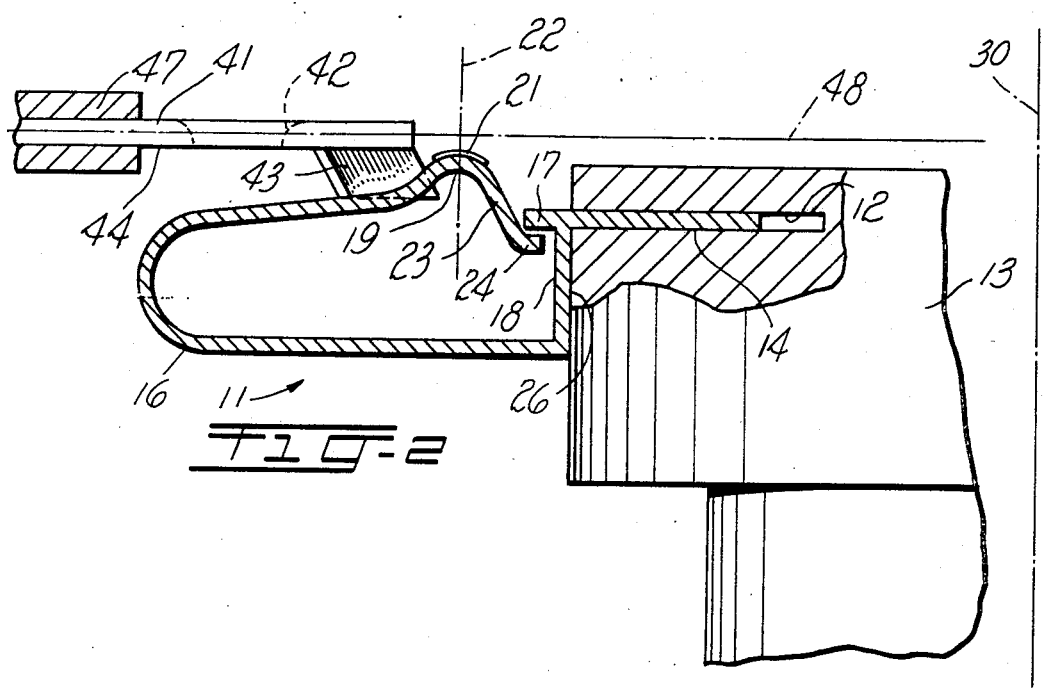
FIG. 2 is an elevational fragmentary section, taken on line 2—2 of FIG. 1, illustrating details of the spring and the relative vertical orientation of the spring and a mask.

As best shown in FIG. 2, each spring 11 consists, for purposes of this description, of (1) a planar terminal 14 received in the associated nest 12 of the turntable, and (2) a generally elliptical head 16 projecting outward from and joined to a left end 17 of the terminal 14 by means of an upwardly extending portion 18. The top of the head 16 has an arcuate protuberance 19, a portion of which is overlaid with a bonded gold contact 21. For simplicity, and without limiting the generality of the following description, it will be assumed that (1) the gold contact 21 is symmetrically disposed about a centerline 22 of the protuberance 19, and that (2) the centerline 22 is vertical.

The side of the protuberance nearer the terminal 14 has an oblique linear portion 23 which forms an acute angle with the terminal 14. The portion 23 terminates at a horizontal end region 24 disposed below and adjacent the left end 17 of the terminal 14. The left end 17 and the end region 24 form a pair of selectively closable contacts of the spring 11.

A surface 26 of the upwardly extending portion 18 on the elliptical spring head serves as a reference surface for the inspection of the protuberance 19 in the manner described below. As shown, each spring is received within the associated nest 12 of the turntable 13 with its reference surface 26 abutting the periphery of the turntable 13.

Referring to FIG. 1, the turntable 13 is provided with an indexing mechanism 27 for successively moving the nested springs 11 into an inspection apparatus 28, constructed in accordance with the invention and shown in block and schematic form for immediate discussion purposes. While the indexing mechanism for the turntable 13 may take any suitable form, the particular arrangement shown in FIG. 1 includes a turntable drive shaft 29 which is driven counterclockwise about a vertical axis 30 by a continuously energized torque motor (not shown) through a suitable worm and wheel drive (not shown). A ratchet wheel 31 is rigidly connected to the shaft 29 for rotation therewith. The periphery of the ratchet wheel 31 is provided with a plurality of equally spaced teeth 32—32 selectively engageable by a pair of spaced, pivotally mounted pawls 33 and 34. The movement of the pawls 33 and 34 is controlled by a pair of solenoids 36 and 37 acting through an associated pair of links 38 and 39. The motion of the ratchet wheel is arrested each time a pawl engages a tooth 32, thereby providing an effect which is exactly opposite to a pawl and ratchet drive. The pawls 33 and 34 are so associated with the periphery of the ratchet wheel that when one of the pawls (illustratively the pawl 33) engages an adjacent tooth 32 as shown to stop the counterclockwise movement of the ratchet wheel (and thus of the drive shaft 30), the other pawl 34 rests on an inclined portion of the ratchet wheel periphery intermediate a pair of successive teeth 32.

In order to rotate the turntable from the index position shown in FIG. 1 (i.e., with the pawl 33 contacting the adjacent tooth 32 of the ratchet wheel), the solenoid 36 is energized to retract the pawl 33 from the engaged tooth 32. This permits the torque motor to rotate the turntable one half the angular distance between successive teeth, whereupon the other pawl 34 engages the adjacent tooth 32 to stop the motion of the turntable. Upon the de-energization of the solenoid 36, the pawl 33 is re-extended and engages a portion of the periphery of the ratchet wheel 29 intermediate successive teeth. The next movement of the turntable is accomplished by energizing the other solenoid 37 to retract the pawl 34. When the turntable again rotates half the distance between successive teeth, the pawl 33 engages the adjacent tooth to stop the rotation. Subsequent movement of the turntable between adjacent index positions is accomplished in a like manner by alternately retracting the pawls 33 and 34. The solenoids may be controlled by a suitable timing circuit (not shown).

Figure 3:
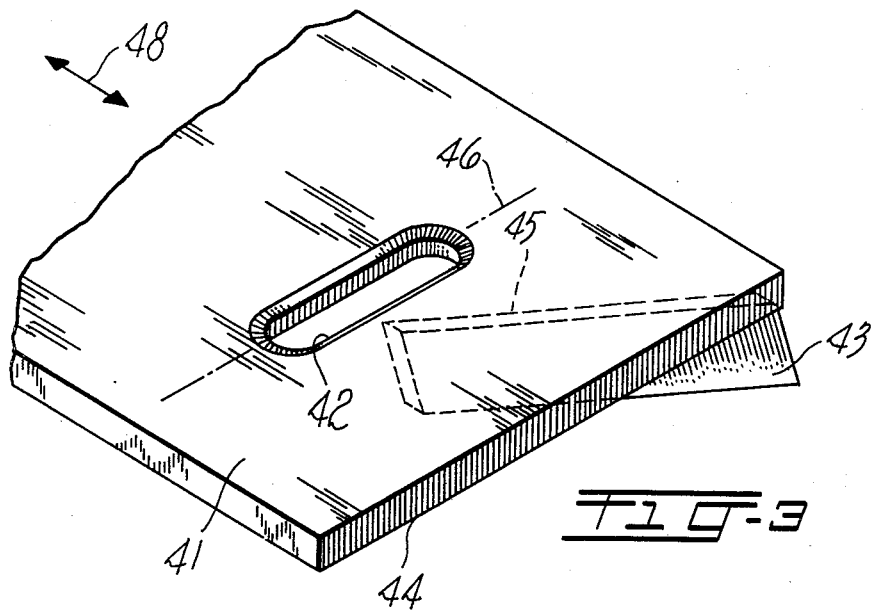
FIG. 3 is a perspective view of a mask suitable for use in the apparatus of FIG. 1.

As best shown in FIGS. 2 and 3, the inspection apparatus includes a horizontally disposed planar mask 41 having a slot 42 and a sloped camming surface 43 displaced from the slot in the direction toward the axis 30 of the turntable 13. The camming surface 43 projects from a lower surface 44 of the mask. The width of the slit is made slightly less than the desired linear width of the gold contact 21 (FIG. 2) on the spring protuberance 19. The top portion of the slot periphery is beveled for ease of illumination, as described below.

The plane of the lower surface 44 of the mask 41 is disposed vertically adjacent to the plane of the uppermost portion (i.e., the gold-overlaid portion) of the spring 11. The mask is arranged so that the plane of the camming surface 43 forms an acute angle with the lower surface 44 and so that an intersection 45 (FIG. 3) of the surfaces 43 and 44 also forms an acuate angle, when extended, with a longitudinal axis 46 of the slot 42. The angle between the surfaces 43 and 44 preferably corresponds to the angle between the linear side 23 (FIG. 2) on the spring protuberance 19 and the spring terminal 14.

The mask 41 is constrained by suitable means, shown schematically as a pair of guide blocks 47—47, for radial movement toward and away from the axis 30 of the turntable 13 along an axis 48. The axis 48 is aligned with one of the index positions of the turntable 13. The mask 41 is so oriented that the longitudinal axis 46 (FIG. 3) of the slot 42 is perpendicular to the axis 48.

The mask 41 is biased in the radially outward direction by suitable means (diagrammatically shown in FIG. 1 as a spring 49) such that the mask is normally urged against a second surface 50. The surface 50 is so positioned that when the mask 41 is biased against it, the slot 42 of the mask is out of alignment with the gold-overlaid portion 21 of an adjacent spring 11, and the camming surface 43 is disposed in engageable relation with the sloping side 23 (FIG. 2) of the protuberance 19.

The mask 41 (FIG. 1) is mechanically coupled to a suitable optical sensing device 51. This device 51 is provided with a pair of output leads 52—52 for transmitting a signal having a first state when the displacement of the mask from the reference surface 50 is within predetermined limits and a second state when the displacement is outside the limits. As indicated in more detail below in connection with FIG. 5, the device 51 may be normally illuminated by a light source 53 to yield the second state. An interruption of the illumination occurs only during a correct displacement of the mask. The output state of the signal on the leads 52—52 is switched from the second state to the first state when the illumination is interrupted.

Figure 4A:
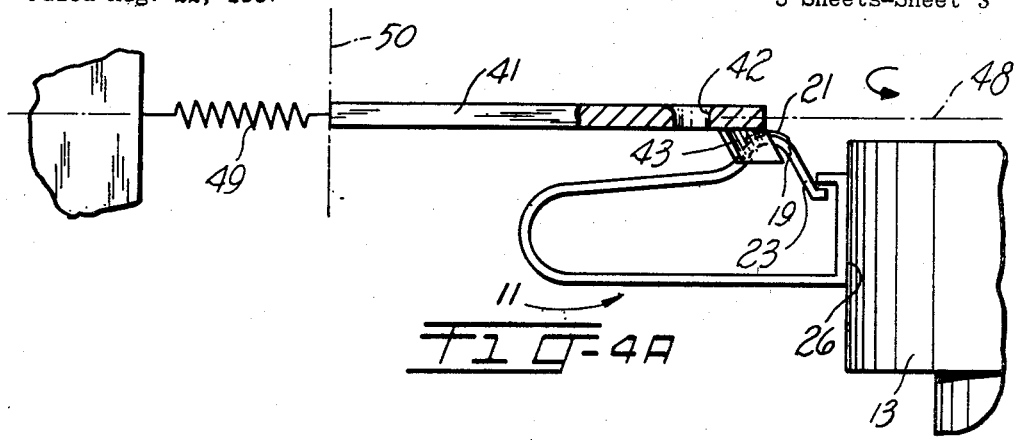
FIGS. 4A–4C are perspective views, taken at successively later points in time, illustrating a camming action between the mask and the spring under test in the apparatus of FIG. 1.
Figure 4B:
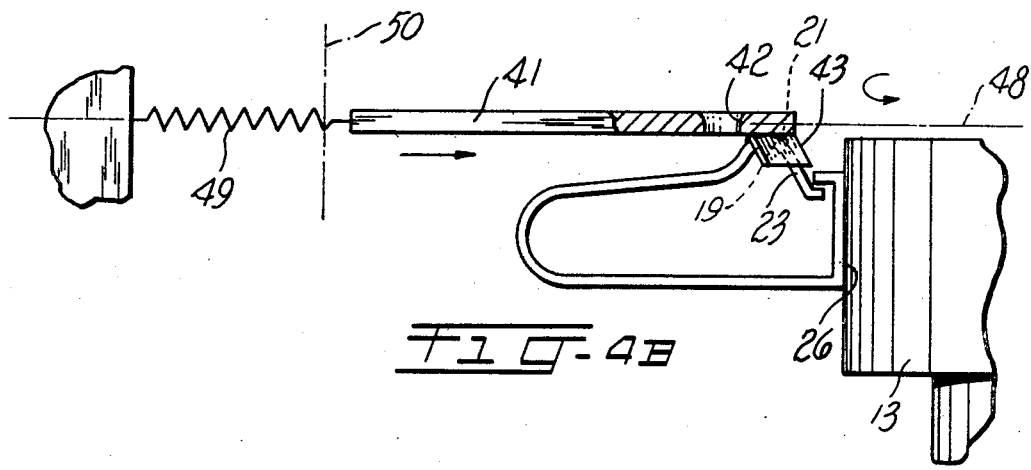

The operation of the portion of the arrangement of FIGS. 1–3 thus far considered will be described in connection with FIGS. 4A–4C. The latter illustrate the relative positions, at successively later points in time, of an incoming contact spring 11 and the mask 41. At the point in time shown in FIG. 4A, the spring 11 has just come into contact with the mask 41 so that the camming surface 43 of the mask is engaged by the linear side 23 of the spring protuberance 19. The further motion of the turntable 13 in the counterclockwise direction will continually move the side 23 along the camming surface 43 through intermediate positions such as that shown in FIG. 4B until the turntable has reached its index position in line with the axis movement 48 (FIG. 4C) of the mask. Since the spring 11 is fixedly held during this indexing movement and the mask 41 is free to move in the direction to the right as shown in the figure, the movement of the side 23 along the camming surface 43 will cause the mask 41 to be displaced a corresponding distance to the right from the reference surface 50. When the turntable has reached its fully indexed position (FIG. 4C), the mask has been displaced to the right by a total distance L under the camming action of the side 23 and the surface 43.

It will be appreciated that the distance L will vary with changes of the point in initial contact (FIG. 4A) of the side 23 on the camming surface 43. This point of initial contact, in turn, is determined by the position of the protuberance 19 on the spring with respect to the spring reference surface 26 abutting the periphery of the turntable 13. Thus, since variations in the dimension L (FIG. 4C) correspond to variations in the location of the protuberance 19, the optical sensing device 51 (FIG. 1) may be set, in a well-known manner, so that its output signal on the leads 52—52 has the first state when the total displacement L (FIG. 4C) of the mask is within a desired range of values and the second state when the displacement is outside this range. The desired range, of course, will correspond to a correct location of the protuberance 19 within specified tolerances.

Figure 4C:
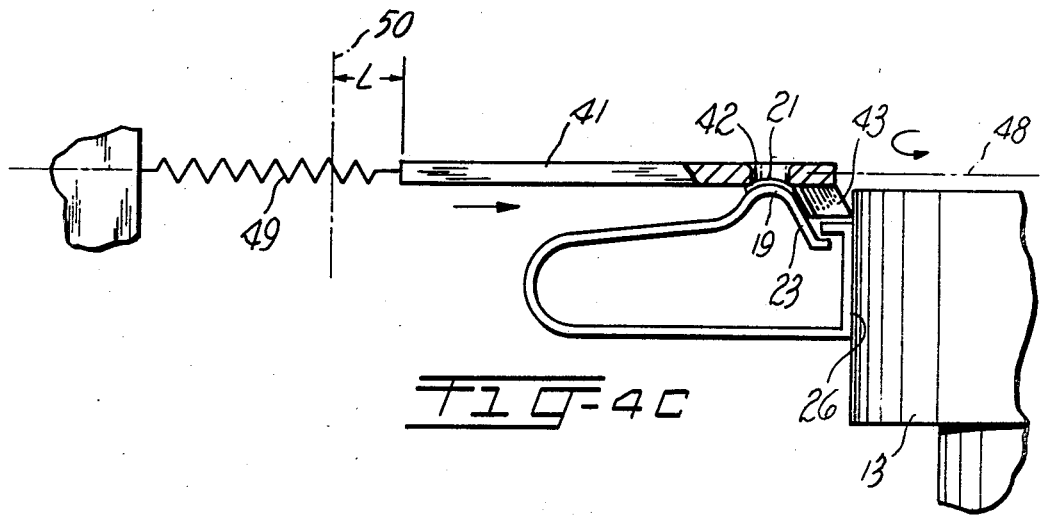

The spacing between the slot 42 and the camming surface 43 on the mask is so chosen with respect to the nominal dimensions of the spring that the displacement of the mask by its full extent to the right, as in FIG. 4C, under the camming action of the spring and the mask will generally align the slot 42 with the underlying gold contact 21 of the protuberance. Since the width of the slot 42 is somewhat less than the width of the gold contact 21, the failure of the contact to overlap both sides of the slot is indicative of either (a) an incorrect position of the contact 21 on the protuberance, or (b) an insufficient contact width.

In general, since the gold contact 21 optically contrasts with the base metal of the spring, it is convenient for an operator to visually ascertain whether the desired overlap of the gold contact 21 with respect to the slot 42 has occurred. For this purpose, the testing apparatus 28 (FIG. 1) may be further provided with a stationary optical projection system 54 for projecting an enlarged image of the region of the slot 42 on the mask onto a suitable screen 54A. If the base metal of the spring is anywhere visible within the projected image of the slot where the gold contact should be, the operator may reject the piece part.

Figure 7:
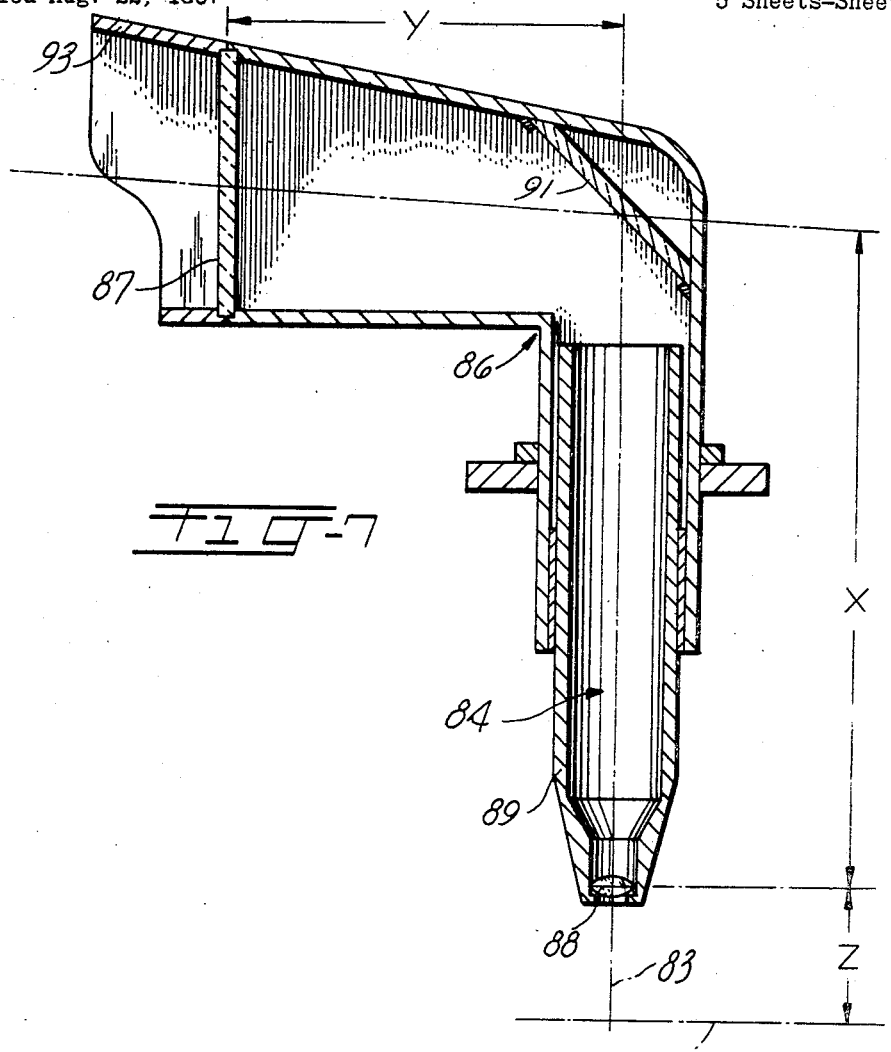
FIG. 7 is a sectional elevation view taken along line 7—7 of FIG. 5.
Figure 6:
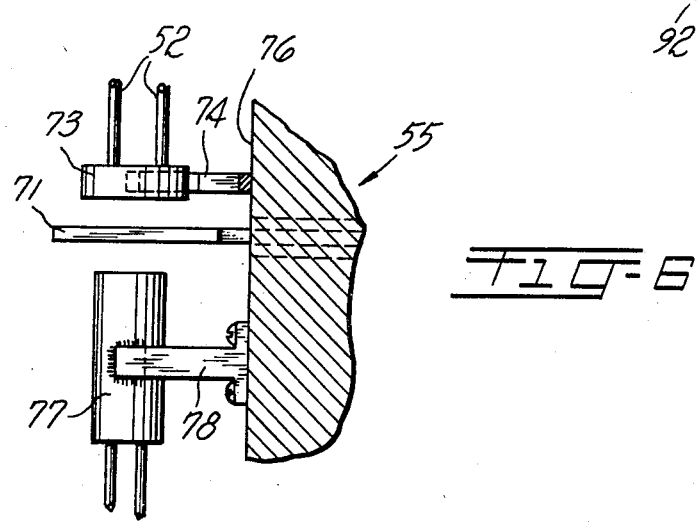
FIG. 6 is a sectional plan view taken along line 6—6 of FIG. 5.

The inspection apparatus is shown in more detail in FIGS. 5–7. The apparatus is shown as being mounted in a housing 55 (FIG. 5 having a first elongated horizontal bore 56 whose axis is parallel to the axis of motion 48 of the mask 41. The mask is slidably mounted for movement to the right with respect to the housing 55 by means of a rod 57 affixed to a rear portion 58 of the mask. The rod 57 is carried in a pair of sleeve bearings 59—59 disposed in the first bore 56.

The mask 41 is normally urged to the left against a vertical surface 61 of the housing 55 by means of a lever 62 pivotally mounted by a pin 63 on a bracket 64 that is affixed to the surface 61. In the position shown in FIG. 5, which functionally corresponds to the situation depicted in FIG. 4C, the mask is displaced away from the reference surface 61 (FIG. 5).

The pin 63 divides the lever into a shorter arm 66 and a longer arm 67. The shorter arm 66 engages a depending portion 68 of the mask to exert the required biasing force to the left. The longer arm 67 extends through a second bore 69 disposed in the housing 55 and situated below and parallel to the first bore 56. The lower arm 67 terminates in a shutter plate 71. A pair of vertically aligned, schematically depicted photocells 72—72 are carried in a circular housing 73 located adjacent to one side of the shutter plate 71. The housing 73 is mounted on a bracket 74 (FIG. 6) affixed to a second vertical side 76 of the housing 55. A stationary source of illumination, such as a projection lamp 77, is provided for normally illuminating both photocells from a location adjacent to the opposite side of the shutter plate 71. The lamp 77 is supported on a bracket 78 affixed to the side 76.

The relative lengths of the longer and shorter arms 66 and 67 (FIG. 5) of the lever 62 are so chosen with respect to the width of the shutter plate 71 and the vertical spacing of the photocells 72—72 that when the mask 41 is biased against the vertical surface 61, the shutter plate 71 is in a position below the path of illumination of at least one of the photocells by the lamp 77 (i.e., in a position below that shown in FIG. 5). As the mask is displaced to the right under the camming action between the spring and the mask in the manner described above, the longer arm 67 of the lever, and thus the shutter plate 71, will be pivoted clockwise. If the displacement of the mask is within predetermined limits as described above, the shutter plate will rotate to the position shown in FIG. 5 and will block illumination from both of the photocells 72—72. If the displacement of the mask 41 is either too small or too large corresponding to an improper location of the protuberance on the spring, the shutter plate will rotate to a position either above or below the position shown in FIG. 5 and will permit some illumination to fall on at least one of the photo-cells. The latter may be arranged in any well-known manner to yield an output signal having the desired first state only when the blocked condition shown in FIG. 5 exists.

The arrangement of FIG. 5 further includes an optical fixture 79 mounted on the housing 55. The fixture includes a pair of obliquely disposed light sources 81 and 82 for illuminating the slotted region of the mask from opposite sides of a vertical centerline 83. The latter is positioned to be in registration with the slot 42 in the mask when the latter is fully displaced from the surface 61 as shown. In this position, a reflected image (not shown) from the slotted region of the mask is directed toward a lens and mirror arrangement 84 (FIG. 7) disposed in a generally L-shaped portion 86 of the housing 55 (FIG. 5). The arrangement 84 (FIG. 7) is designed to project an enlarged image of the slotted region in the mask on a vertically mounted projection screen 87. For this purpose, the arrangement 84 may include a double-convex lens 88 having unequal focal lengths and carried in a tube 89 coaxial with the centerline 83. The tube is mounted, by means not illustrated, partially within the portion 86. A planar reflecting mirror 91 is suitably mounted at a distance X above the lens 88 at an angle of 45° to the horizontal for routing upwardly directed light rays from the lens 88 to the screen 87. The latter is assumed to be located at a distance Y from the mirror.

The longer focal length of the lens 88 is the distance $X+Y$, while the shorter focal length is equal to the distance Z from the lens to a plane 92 of the slot in the mask. A light shield 93 is placed over the screen 87 to facilitate viewing in a lighted room.

The embodiment of FIGS. 5–7 functions in a manner identical in all respects to that described in connection with FIGS. 1–4.

It is to be understood that the above-described arrangements are merely illustrative of the principles of the invention. Numerous other modifications will suggest themselves to those skilled in the art. For example, if the gold contact on the spring is displaced from the center of the protuberance, the sides of the slot in the mask may be suitably shaped to allow efficient centering of the gold contact region in the slot and illumination thereof by the optical projection system. Such modifications may be devised without departing from the spirit and scope of the invention.

What is claimed is:
1. In an apparatus for gaging the location of a protuberance on an article that is moved into an inspection station:
   a planar mask disposed at the inspection station and having a slot generally co-extensive with the protuberance;
   means for movably supporting the mask in the path of movement of the article with the slot normally out of alignment with the protuberance;
   camming means carried by the mask for engagement with a first side of the protuberance on the moving article for moving the mask in a direction tending to align the slot with the protuberance, the amount of movement of the mask being indicative of the location of the protuberance on the article; and
   first optical means responsive to the movement of the mask for indicating a first condition when the movement is within predetermined limits and a second condition when the movement is outside the limits.

2. Apparatus as defined in claim 1, further comprising second optical means for projecting an enlarged image of the slot in the mask.

3. Apparatus as defined in claim 1, wherein the first optical sensing means comprises, in combination:
   a pair of photodetectors;
   a shutter movably mounted and positionable to overlie both of the photodetectors; and
   means rendered effective by the movement of the mask for moving the shutter to overlie both of the photodetectors only when the movement is within the predetermined limits.

4. Apparatus as defined in claim 3, further comprising second optical means for projecting an enlarged image of the slot in the mask.

5. Apparatus as defined in claim 3, in which the moving means comprises, in combination:
   a lever; and
   means for pivoting the lever to define a longer and a shorter arm thereof with the shorter arm of the lever in engagement with the mask and with the longer arm terminating at the shutter.

6. Apparatus for inspecting a protuberant portion of an article, which comprises:
   a mask having a slot generally co-extensive with the protuberant portion;
   means for urging the mask into a reference position;
   means slidably mounting the mask for lateral movement in one direction away from the predetermined position;
   means for moving the article into engagement with the mask;
   camming means carried by the mask in the path of the protuberance for effecting the displacement of the mask in the one direction upon the engagement of the mask and the article;
   first optical means responsive to the displacement of the mask in the one direction for indicating a first condition when the displacement is within predetermined limits and a second condition when the displacement is outside the limits; and
   second optical means for projecting an enlarged image of the slot in the mask when the latter is displaced in the one direction.

7. Apparatus as defined in claim 6, in which the first optical means comprises, in combination:
   a light source;
   a pair of photocells normally illuminated by the light source, the photodetectors yielding the first condition when either is illuminated and the second condition when at least one is illuminated; and
   a shutter carried by the urging means and selectively movable in the path of the illumination of the photocells for blocking the illumination of both photocells by the light souce only when the displacement of the mask is within the predetermined limits.

8. Apparatus as defined in claim 7, in which the urging means comprises, in combination:
   a lever; and
   means for pivoting the lever to define a longer and a shorter arm thereof with the shorter arm of the lever in engagement with the mask and with the longer terminating at the shutter.

References Cited
UNITED STATES PATENTS

| | | |
|---|---|---|
| 1,732,730 | 10/1929 | Porter et al. _____ 356—166 |
| 2,424,373 | 7/1947 | Spiller et al. _____ 356—172 |
| 2,929,148 | 3/1960 | Werth. |
| 3,402,813 | 9/1968 | Molbach _____ 209—80 |

RONALD L. WIBERT, Primary Examiner

J. ROTHENBERG, Assistant Examiner

U.S. Cl. X.R.

33—174; 209—80; 250—237